US 8,457,210 B2

(12) United States Patent
Masuda

(10) Patent No.: US 8,457,210 B2
(45) Date of Patent: Jun. 4, 2013

(54) IMAGE DECODING APPARATUS AND METHOD ADDING A SIGN OF THE COEFFICIENT BEFORE LINEAR ESTIMATION

(75) Inventor: Tadaaki Masuda, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 13/217,025

(22) Filed: Aug. 24, 2011

(65) Prior Publication Data

US 2012/0155534 A1    Jun. 21, 2012

(30) Foreign Application Priority Data

Dec. 20, 2010    (JP) ................................. 2010-283206

(51) Int. Cl.
*H04N 7/12* (2006.01)

(52) U.S. Cl.
USPC ...................................................... 375/240.2

(58) Field of Classification Search
USPC ............... 375/240.01, 240.03, 240.2, 240.26
IPC ....................................................... H04N 7/12
See application file for complete search history.

(56) References Cited

U.S. PATENT DOCUMENTS

| 2006/0210182 A1 | 9/2006 | Kimura |
| 2008/0191966 A1 | 8/2008 | Van Berkel |
| 2011/0228843 A1 | 9/2011 | Narroschke et al. |

FOREIGN PATENT DOCUMENTS

| JP | 03-283785 | 12/1991 |
| JP | 09-149414 | 6/1997 |
| JP | 2001-346209 | 12/2001 |
| JP | 2006-262278 | 9/2006 |
| JP | 2009-272792 | 11/2009 |
| WO | WO 2010-061607 | 6/2010 |

OTHER PUBLICATIONS

Japanese Patent Application No. 2010-283206; Notice of Reasons for Rejection; Mailed Nov. 8, 2011 (with English translation).

*Primary Examiner* — Young Lee
(74) *Attorney, Agent, or Firm* — Blakely, Sokoloff, Taylor & Zafman LLP

(57) ABSTRACT

An image decoding apparatus includes an entropy decoder, an inverse quantization module, an estimation module, an estimated coefficient value limiting module, and an inverse discrete cosine transformation module. The estimation module performs linear estimation of a correction value of a discrete cosine transformation coefficient to be processed, for an inverse quantization result, based on discrete cosine transformation coefficients in a rectangular area which includes a pixel to be processed and discrete cosine transformation coefficients in an area adjacent to the rectangular area including the pixel to be processed. The estimation coefficient value limiting module limits the correction value such that the correction value estimated by the estimation module falls within a predetermined range based on a quantization step.

5 Claims, 14 Drawing Sheets

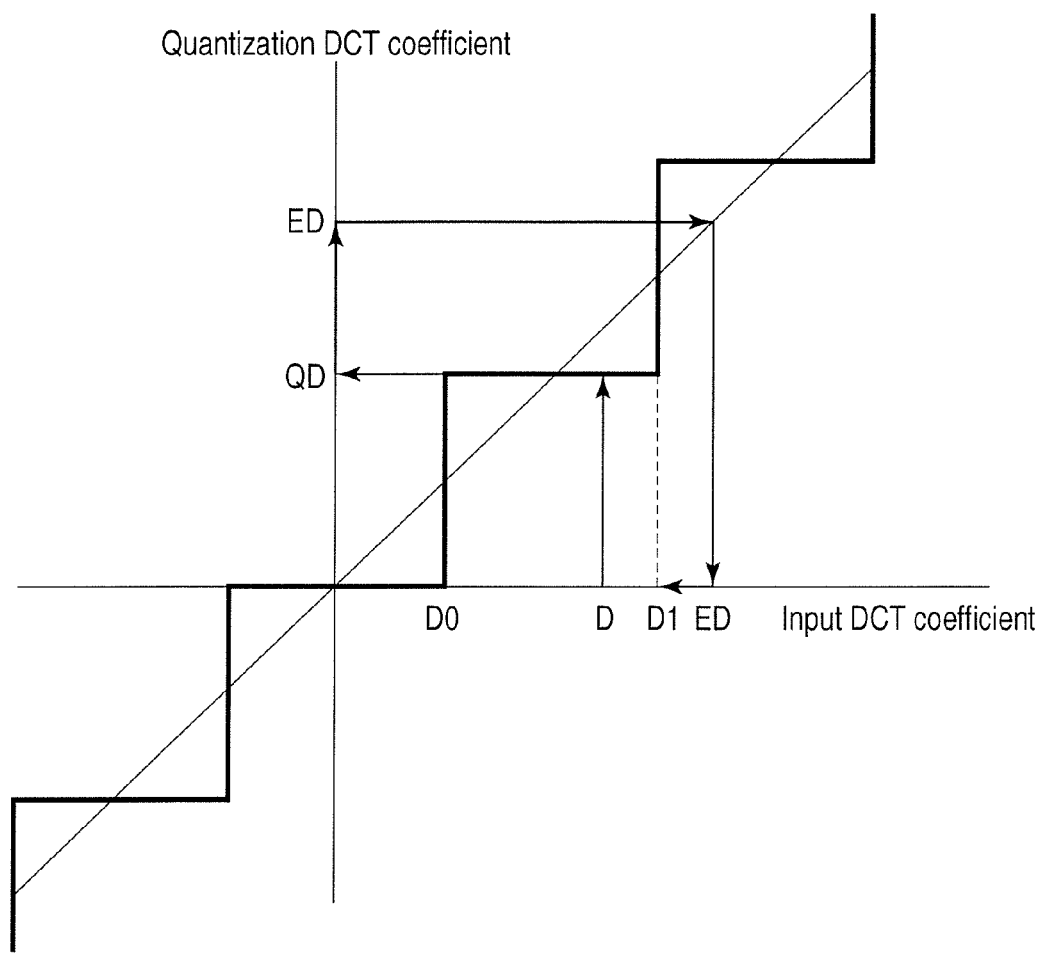
F I G. 2

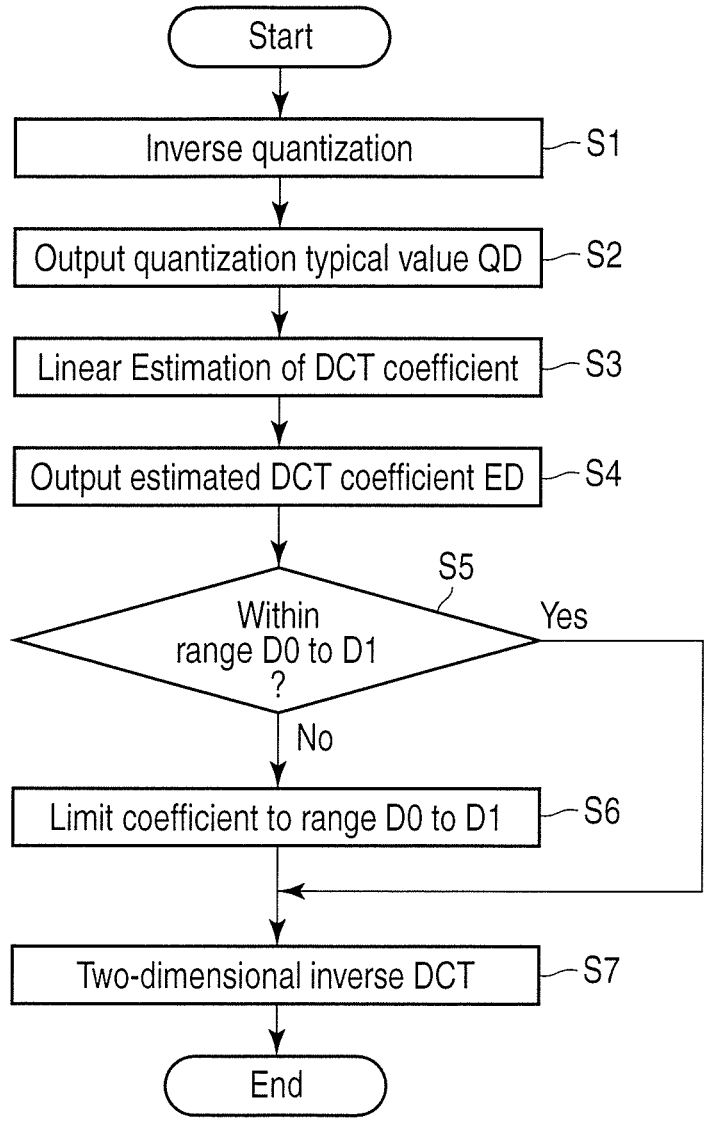
F I G. 4

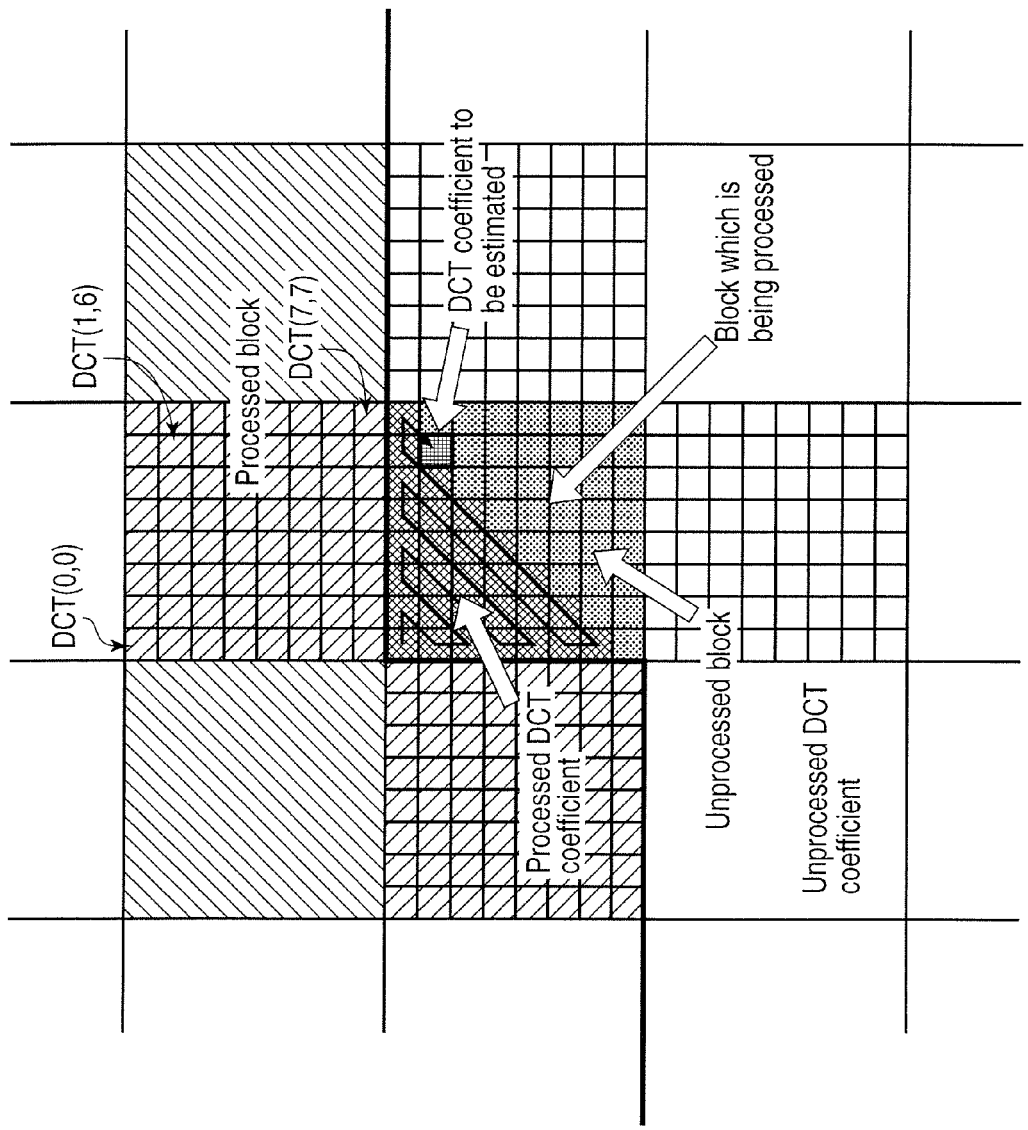
F I G. 5

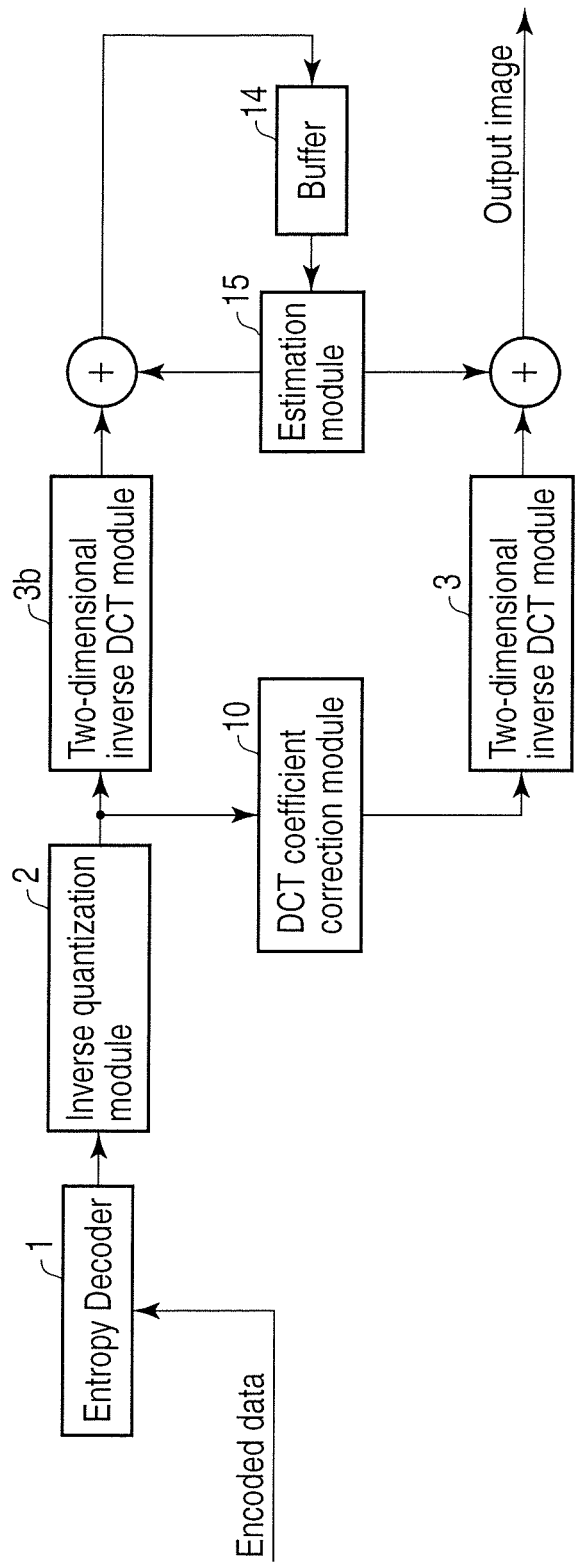
F I G. 8

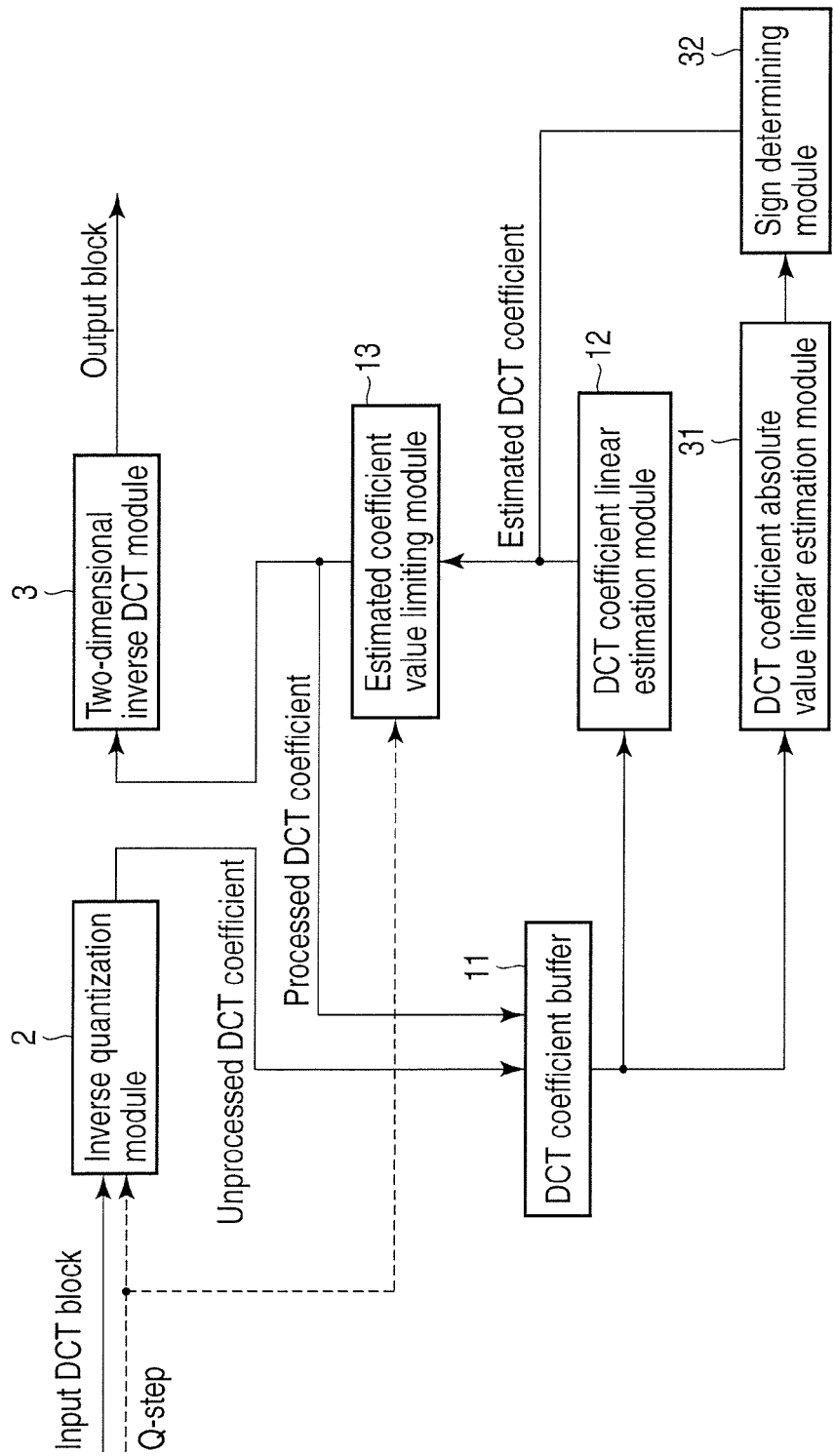
F I G. 11

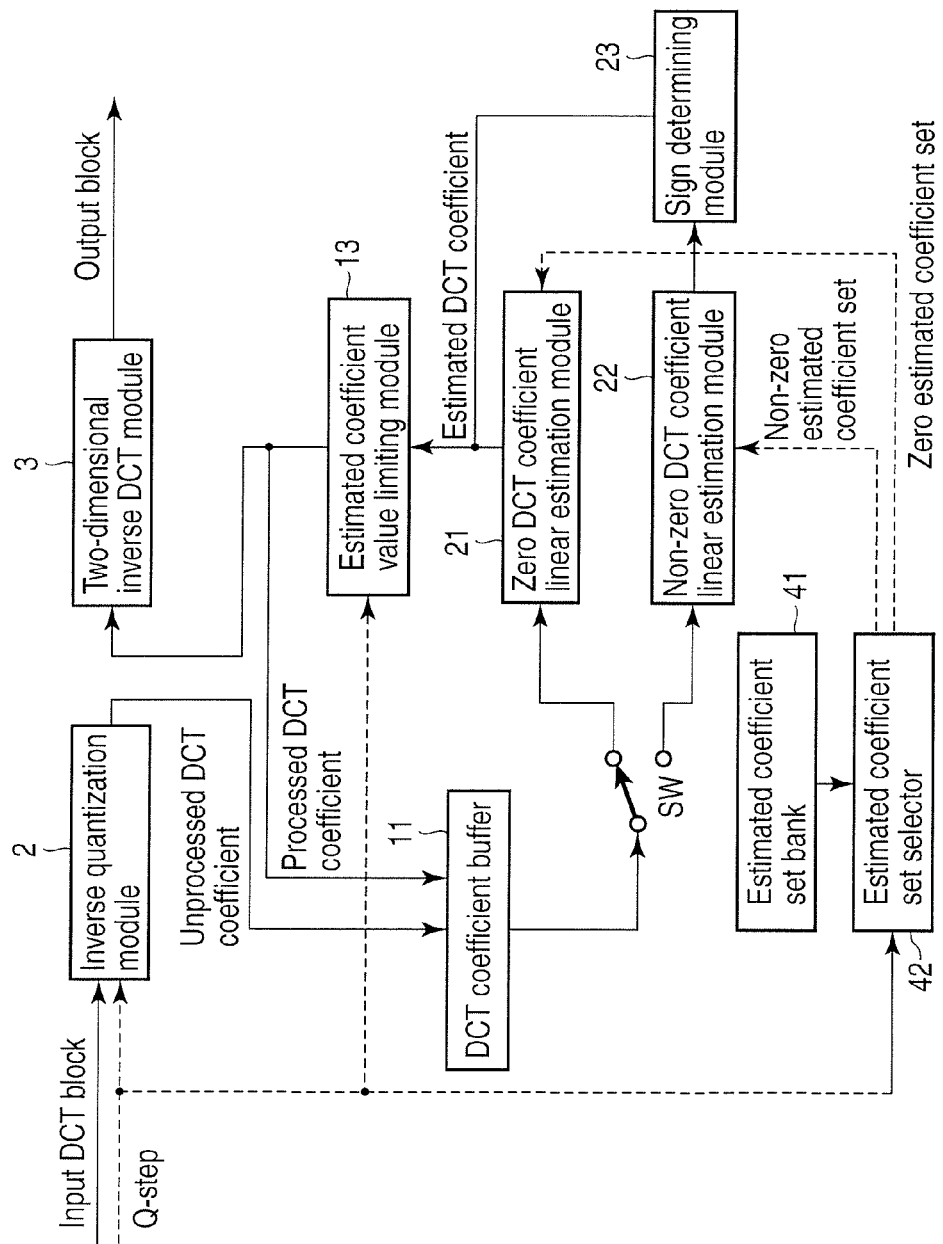
F I G. 13

IMAGE DECODING APPARATUS AND METHOD ADDING A SIGN OF THE COEFFICIENT BEFORE LINEAR ESTIMATION

CROSS-REFERENCE TO RELATED APPLICATIONS

This application is based upon and claims the benefit of priority from prior Japanese Patent Application No. 2010-283206, filed Dec. 20, 2010, the entire contents of which are incorporated herein by reference.

FIELD

Embodiments described herein relate generally to an image decoding apparatus, an image decoding method and a computer readable, non-transitory storage medium, which process image data.

BACKGROUND

In conventional art, apparatuses which record long-play content by a recording medium by using data compressed by high-efficiency encoding for digitized image signals, and services which distribute content through digital broadcasting signals from a satellite and a terrestrial station or a network have been put to practical use. In such services, high-efficiency encoding which realizes a large compression rate is required to broadcast or transmit a large quantity of image and sound data which include an enormous data quantity.

To achieve high-efficiency encoding of moving images, encoding methods such as Moving Picture Experts Group phase 2 (MPEG 2), which is an international standard, are used. These encoding methods are methods which compress a data quantity by using correlation between adjacent pixels (spatial direction) of an image signal, and correlation between adjacent frames or fields (time direction).

An image signal of an input frame is divided into processing units, which is called macroblocks, by a brightness signal, and each macroblock includes 16 pixels in a horizontal direction and 16 pixels in a vertical direction. Each divided macroblock data is further divided into two-dimensional blocks, each of which includes 8 pixels in a horizontal direction and 8 pixels in a vertical direction. Each of the divided two-dimensional blocks is subjected to a two-dimensional discrete cosine transformation (DCT), which is a type of discrete orthogonal transformation. Image encoding apparatuses perform quantization for a DCT coefficient which is obtained by the DCT, apply entropy encoding for a quantization result, and thereby generates encoded data.

When an image is compressed by encoding algorithm by DCT and quantization as described above, original data is lost by the quantization, and encoding distortion such as block distortion and mosquito distortion is caused in a decoded image. Therefore, it is impossible in prior art to perform image restoration with high accuracy.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a diagram illustrating an example of quantization and DCT coefficient limitations.

FIG. 4 is a flowchart illustrating an example of processing operation of the image decoding apparatus according to the first embodiment.

FIG. 5 is a diagram illustrating an example of a form of linear estimation of a DCT coefficient performed by the image decoding apparatus according to the first embodiment.

FIG. 8 is a block diagram illustrating a modification of the structure of the image decoding apparatus according to the first embodiment.

FIG. 11 is a block diagram illustrating a modification of the structure of the image decoding apparatus according to the second embodiment.

FIG. 13 is a block diagram illustrating a structure example of an image decoding apparatus according to a third embodiment.

DETAILED DESCRIPTION

Various embodiments will be described hereinafter with reference to the accompanying drawings.

In general, according to one embodiment, an image decoding apparatus comprises an entropy decoder, an inverse quantization module, an estimation module, an estimated coefficient value limiting module, and an inverse discrete cosine transformation module. The entropy decoder restores a quantization discrete cosine transformation coefficient by performing entropy decoding of an image, which is encoded by successively subjecting each of divided rectangular areas of an image to be encoded to two-dimensional discrete cosine transformation and quantization. Each of the divided rectangular areas is formed of a predetermined number of pixels. The inverse quantization module performs inverse quantization on a result of the decoding. The estimation module performs linear estimation of a correction value of a discrete cosine transformation coefficient to be processed, for an inverse quantization result, based on discrete cosine transformation coefficients in a rectangular area which includes a pixel to be processed and discrete cosine transformation coefficients in an area adjacent to the rectangular area including the pixel to be processed. The estimation coefficient value limiting module limits the correction value such that the correction value estimated by the estimation module falls within a predetermined range based on a quantization step. The inverse discrete cosine transformation module performs two-dimensional inverse discrete cosine transformation for a processing result obtained by the estimation coefficient value limiting module.

Embodiments will be explained hereinafter with reference to drawings.

(First Embodiment)

First, a first embodiment will be explained hereinafter. To facilitate understanding of the present embodiment, a general image decoding apparatus will be explained.

An image encoding apparatus (not shown), which is compliant with JPEG that is used for encoding still images and MPEG2 that is used for encoding moving pictures, divides pixels in an input image frame into blocks of a size of N×N pixels, such as 8×8 pixels. The image encoding apparatus performs two-dimensional discrete cosine transformation (two-dimensional DCT), which is discrete orthogonal transformation, for each of the divided blocks, and thereby obtains a DCT coefficient. The image encoding apparatus performs quantization for the DCT coefficient, performs entropy encoding for a result of the quantization, and thereby generates encoded data. In addition, the image encoding apparatus performs inter-picture estimation and intra-picture estimation before the two-dimensional DCT to obtain an estimated residual, and performs estimated residual encoding in which the estimated residual is used as an input of the two-dimensional DCT.

Figure 1:
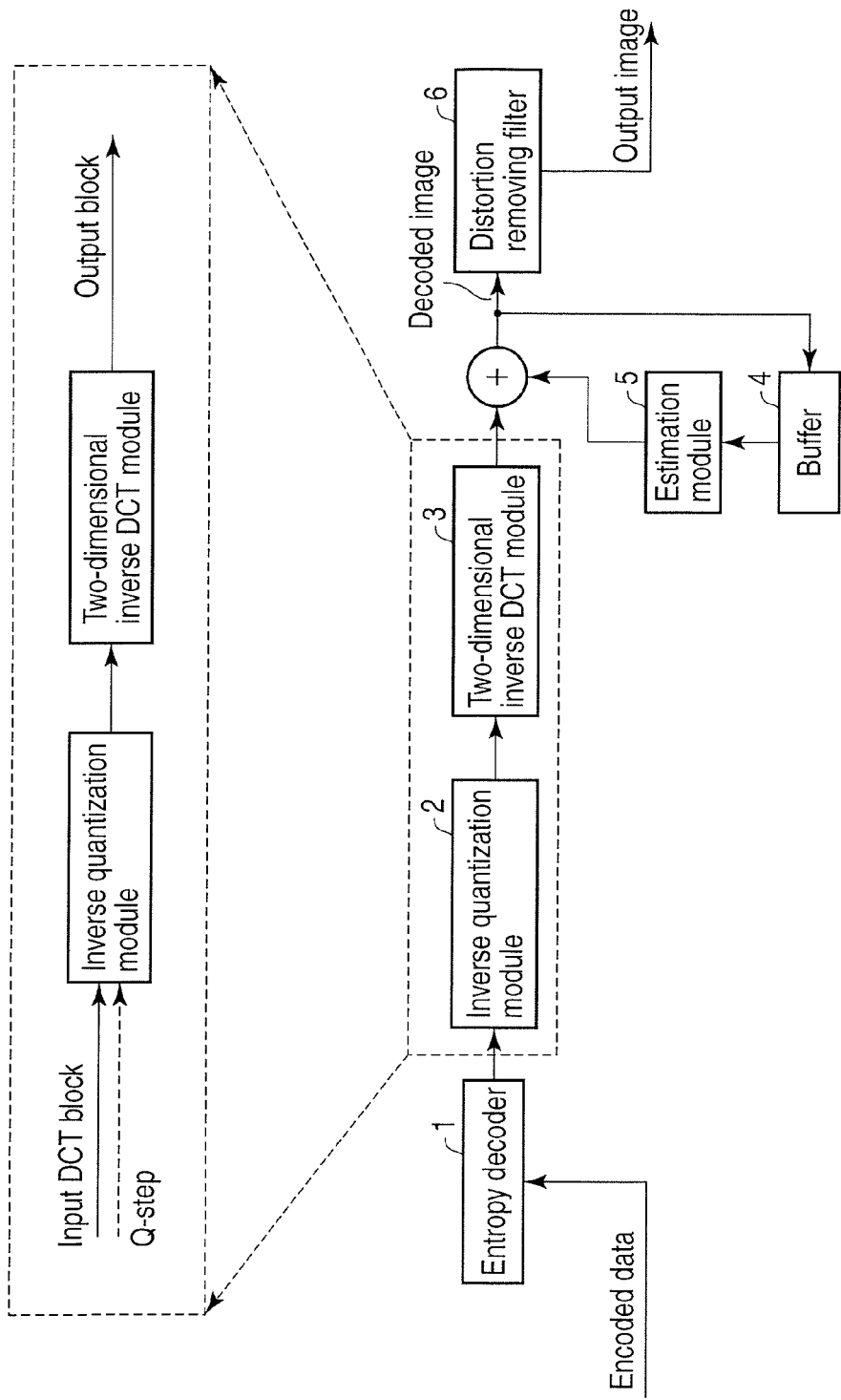
FIG. 1 is a block diagram illustrating a structure example of a general image decoding apparatus.

FIG. 1 is a block diagram illustrating a structure example of a general image decoding apparatus.

As illustrated in FIG. 1, the general image decoding apparatus comprises an entropy decoder 1, an inverse quantization module 2, a two-dimensional inverse DCT module 3, a buffer 4 which is a storage device, an estimation module 5, and a distortion removing filter 6. The distortion removing filter 6 is not indispensable for the image decoding apparatus, but may be omitted.

The entropy decoder 1 performs entropy decoding for encoded data transmitted from an image encoding apparatus. Data of the processing result includes a two-dimensional DCT coefficient quantization value of each block.

The inverse quantization module 2 performs inverse quantization for data in each block, which is a decoding result obtained by the entropy decoder 1, and thereby obtains a quantization typical value. The two-dimensional inverse DCT module 3 performs two-dimensional inverse DCT for a processing result obtained by the inverse quantization module 2, and thereby obtains a decoded image block.

As described above, when the image encoding apparatus performs intra-picture estimation or inter-picture estimation, data obtained by adding an estimated image block to a processing result obtained by the two-dimensional inverse DCT module 3 is accumulated in the buffer 4. The estimation module 5 generates estimated image data based on a decoded image accumulated in the buffer 4. The image decoding apparatus obtains a decoded image block by adding a generation result obtained by the estimation module 5 to a decoded estimated residual image block by using an adder. The image decoding apparatus arranges decoded data items of the respective blocks in the respective positions of the original image, and outputs the arranged images as a decoded image to the distortion removing filter 6.

Next, quantization of image data and DCT coefficient limitations will be explained hereinafter. FIG. 2 is a diagram illustrating an example of quantization and DCT coefficient limitations.

When a DCT coefficient indicated by a two-dimensional DCT processing result of image data by the image encoding apparatus has a value D, an output has a value QD by quantization and inverse quantization, as illustrated in FIG. 2. In the same manner, when the value of the input DCT coefficient falls within a range from a value D0 to D1 on an axis of the input DCT coefficient, which is the horizontal axis of FIG. 2, the output always has a value QD. The value QD is referred to as quantization typical value.

A difference between the value D and the value QD serves as a quantization error component, and a component obtained by subjecting the error component to two-dimensional inverse quantization serves as a distortion component in a decoded image. The interval between the value D0 and the value D1 is set according to conditions of the image encoding apparatus. Data of the interval is transmitted to the image decoding apparatus as a quantization step (Q-step). In addition, the quantization characteristic illustrated in the graph of FIG. 2 generally varies according to the order of the two-dimensional DCT coefficient input to the image encoding apparatus.

A block diagram illustrated in an upper part of FIG. 1 is a diagram of the part of the inverse quantization module 2 and the two-dimensional inverse DCT module 3, which is extracted from the block diagram illustrated in a lower part of FIG. 1. The upper block diagram shows that an input DCT block and a Q-step are input from the entropy decoder 1 to the inverse quantization module 2, and an output block is output from the two-dimensional inverse DCT module 3.

The distortion removing filter 6 illustrated in FIG. 1 performs distortion removal processing for the decoded image. Generally, as distortion removal processing, the distortion removal filter 6 determines minute fluctuating components of a brightness value in the image as mosquito distortion, and removes the components, while edge components in the image are maintained as much as possible.

When the minute fluctuating components of the brightness value are removed, the distortion removing filter 6 controls the effect in accordance with the Q-step. In addition, the distortion removal filter 6 causing pixels around the boundary between blocks to pass through a filter which has a low-pass characteristic, and thereby reduces block distortion. However, these processing steps only perform image correction based on a favorable visual impression of the output image, regardless of the original form of data lost by quantization, among data included in the original image data before encoding, and do not restore data of the original image data.

Figure 3:
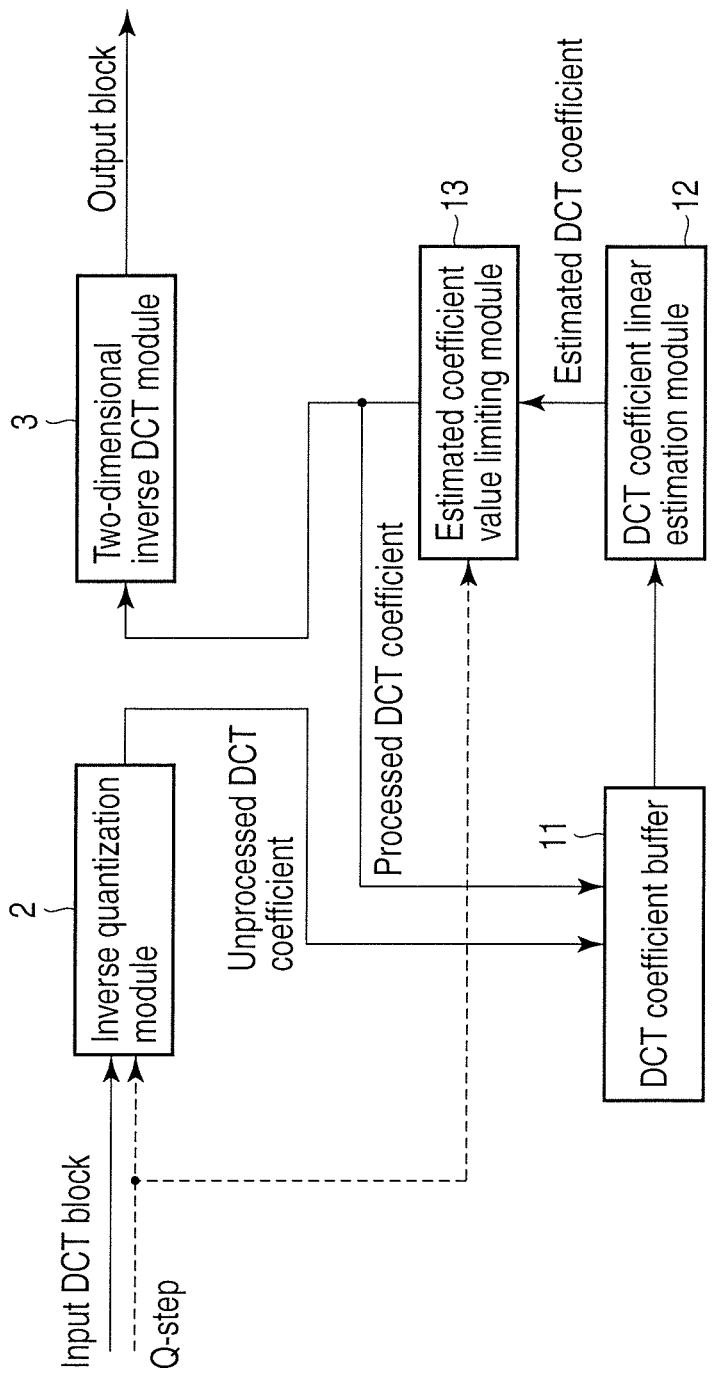
FIG. 3 is a block diagram illustrating a structure example of an image decoding apparatus according to a first embodiment.

FIG. 3 is a block diagram illustrating a structure example of an image decoding apparatus according to a first embodiment. FIG. 4 is a flowchart which illustrates an example of processing operation of the image decoding apparatus according to the first embodiment.

The image decoding apparatus according to the first embodiment corrects a DCT coefficient, which is output as a quantization typical value QD by inverse quantization, to a more proper value by using a DCT coefficient in the same block or a value of a DCT coefficient in an adjacent block, and thereby restores data which is lost in the process of quantization with high accuracy.

As illustrated in FIG. 3, the image decoding apparatus according to the present embodiment comprises an inverse quantization module 2, which is connected to the entropy decoder 1 illustrated in FIG. 1, a two-dimensional inverse DCT module 3, a DCT coefficient buffer 11, a DCT coefficient linear estimation module 12, and an estimated coefficient value limiting module 13.

First, the entropy decoder 1 performs entropy decoding for encoded data transmitted from the image encoding apparatus 1. The entropy decoder 1 outputs this processing result to the inverse quantization module 2, together with Q-step data transmitted from the image encoding apparatus. Then, the inverse quantization module 2 performs inverse quantization for data in a block, which is a decoding result obtained by the entropy decoder 1 (Step S1). The inverse quantization module 2 obtains a quantization typical value QD by this processing, and outputs the quantization typical value QD to the DCT coefficient buffer 11 (Step S2). The Q-step data from the entropy decoder 1 is input to the estimated coefficient limiting module 13.

The DCT coefficient buffer 11 temporarily stores DCT coefficients in the same block and the adjacent blocks, which are used for estimation of the DCT coefficient. The DCT coefficient buffer 11 stores the quantization typical value QD of the DCT coefficient, which is the output of the inverse quantization module 2, without any processing. However, corrections of the DCT coefficient are successively performed, and the stored content of the DCT coefficient buffer 11 is replaced by the corrected DCT coefficient each time.

Correction of the DCT coefficient is performed by the DCT coefficient linear estimation module 12 and the estimated coefficient value limiting module 13. The details of DCT coefficient linear estimation will be described later.

The DCT coefficient linear estimation module 12 performs linear estimation of the DCT coefficient based on the quantization typical value QD of the DCT coefficient (Step S3). By this processing, the DCT coefficient linear estimation module 12 obtains an estimated DCT coefficient ED as illustrated in FIG. 2, and outputs the estimated DCT coefficient ED to the estimated coefficient value limiting module 13 (Step S4).

When the estimated DCT coefficient ED output from the DCT coefficient linear estimation module 12 is out of the range D0 to D1 illustrated in FIG. 2 (NO in Step S5), the estimated coefficient value limiting module 13 limits the estimated DCT coefficient ED to the range D0 to D1. The estimated coefficient limiting module 13 outputs the limitation result as a corrected DCT coefficient to the two-dimensional inverse DCT module 3 (Step S6).

When the estimated DCT coefficient ED falls within the range D0 to D1 (YES in Step S5), the estimated coefficient value limiting module 13 outputs the estimated DCT coefficient ED from the DCT coefficient linear estimation module 12 to the two-dimensional inverse DCT module 3 without any processing.

Operation of the estimated coefficient value limiting module 13 will be explained hereinafter with reference to FIG. 2. When the value of the estimated DCT coefficient which is an output from the DCT coefficient linear estimation module 12 is the value ED illustrated in FIG. 2, the value ED exists out of the range D0 to D1 which is the range of the DCT coefficient that generates the quantization typical value QD, as described above. The value ED exceeds a boundary value D1 which is an upper limit value of the range.

Specifically, the estimated value ED is a value which the original image before encoding cannot have. In this case, the estimated coefficient value limiting module 13 outputs the boundary value D1 which is close to the value ED as the value of the limited estimated DCT coefficient to the two-dimensional inverse DCT module 3.

When the estimated value ED is smaller than a boundary value D0 which is a lower limit value of the above range, the estimated coefficient value limiting module 13 outputs the boundary value D0 which is close to the value ED as the value of the limited estimated DCT coefficient to the two-dimensional inverse DCT module 3.

When the estimated value ED falls within the range D0 to D1, the estimated coefficient value limiting module 13 outputs the estimated value ED to the two-dimensional inverse DCT module 3 without any processing.

When the value ED is widely out of the range D0 to D1, the estimated coefficient value limiting module 13 determines that estimation of the DCT coefficient ends in failure, and selects a preset value between D0 to D1 as output value, not D0 or D1.

In the present embodiment, the value of the Q-step is used as side data to determine the values D0 and D1. However, the image encoding apparatus may set the range of the DCT coefficient which generates the quantization typical value QD to a range which is slightly different from the above range of D0 to D1, or forcibly change the DCT coefficient which originally has a nonzero value to 0, for the purpose of improving the encoding efficiency and reducing quantization distortion.

There are various types of image encoding apparatuses, and it is impossible for the image decoding apparatus to strictly determine what quantization the image encoding apparatuses perform. Therefore, in the present embodiment, the estimated coefficient value limiting module 13 performs limitation processing when the value ED is out of a range which has a small margin with respect to the range D0 to D1.

After the processing of Step S6 or when the estimated coefficient value limiting module 13 determines "YES" in the processing of Step S5, the two-dimensional inverse DCT module 3 generates a decoded image block by performing two-dimensional inverse DCT using the DCT coefficient which is output from the estimated coefficient value limiting module 13 (Step S7).

Next, detailed of linear estimation processing of the DCT coefficient will be explained hereinafter. FIG. 5 is a diagram illustrating an example of a form of linear estimation of the DCT coefficient performed by the image decoding apparatus according to the first embodiment.

In the example illustrated in FIG. 5, an area in the image is divided into blocks, each of which has a size of 8×8 pixels, and two-dimensional DCT coefficients for pixel values in the block are arranged in the same respective spatial positions in the image as those of the original block. The center block illustrated in FIG. 5 is a to-be-processed block for which decoding is being performed. The upper and left blocks of the center block are blocks which have been processed. The right and lower blocks of the center block are blocks which are unprocessed.

Each element in each block has a value of a two-dimensional DCT coefficient. As illustrated in the block above the center block in FIG. 5, the upper left element in each block has a DCT (0, 0) which is a DCT coefficient of the lowest order, the lower right element in each block has a DCT (7, 7) which is a DCT coefficient of the highest order, and the element of i row and j column in the middle of each block has DCT (I, j).

The processed DCT coefficients in the processed blocks and the processed DCT coefficients in the to-be-processed block are DCT coefficients which have been subjected to estimation. Unprocessed DCT coefficients in unprocessed blocks and unprocessed DCT coefficients in the to-be-processed blocks are DCT coefficients (quantization typical values) which have not been subjected to estimation.

DCT coefficients of elements which have been subjected to DCT coefficient estimation in a zigzag scanning order from the low-order DCT coefficient in the to-be-processed block which is the center block in FIG. 5 are estimated DCT coefficients. A DCT (1, 6) which is a DCT coefficient of an element indicated by an arrow of a zigzag scanning order of the block, is a DCT coefficient which is being subjected to estimation. DCT coefficients of the other elements in the block are unprocessed DCT coefficients which have not been subjected to estimation.

Figure 6:
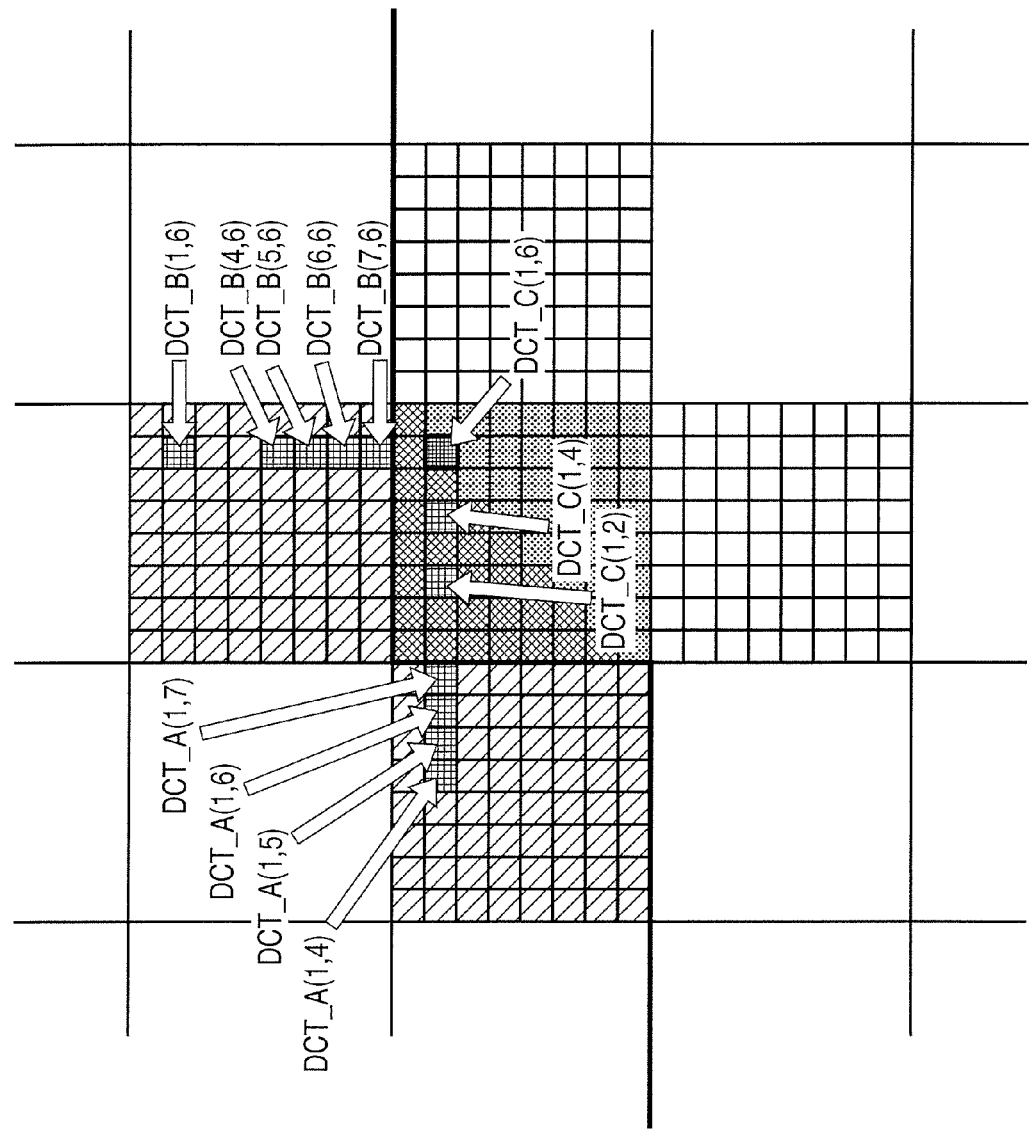
FIG. 6 is a diagram illustrating an example of a form of linear estimation of a DCT coefficient performed by the image decoding apparatus according to the first embodiment.
Figure 7:
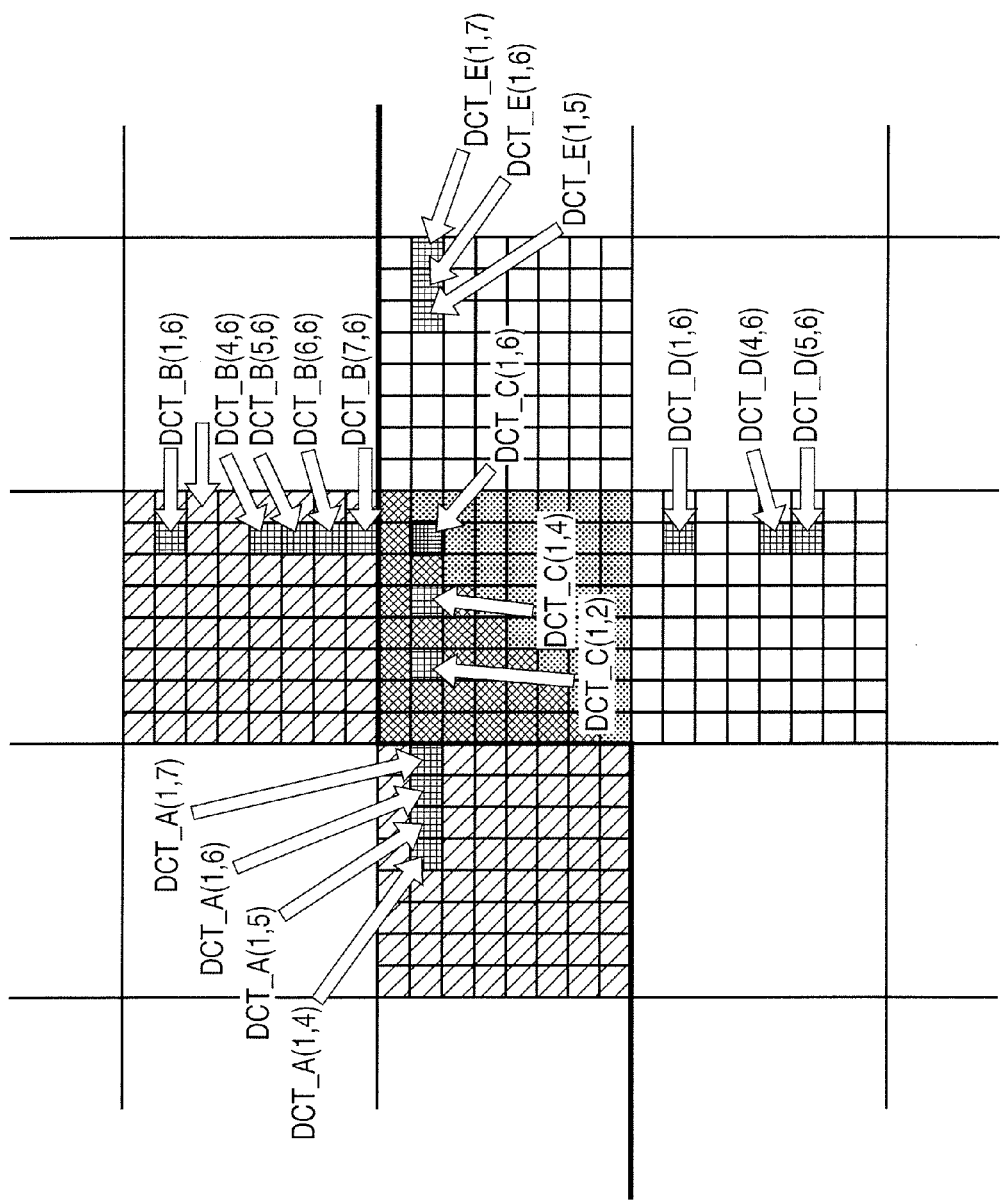
FIG. 7 is a diagram illustrating an example of a form of linear estimation of a DCT coefficient performed by the image decoding apparatus according to the first embodiment.

FIG. 6 and FIG. 7 are diagrams which illustrate examples of a form of linear estimation of the DCT coefficient by the image decoding apparatus according to the first embodiment.

In FIG. 6 and FIG. 7, suppose that the to-be-processed block which is the center block in FIG. 5 is referred to as block C, the left block of the block C is referred to as block A, an adjacent block which contacts with the top of the block C is referred to as block B, an adjacent block which contacts with the bottom of the block C is referred to as block D, and an adjacent block which contacts with the right of the block C is referred to as block E. In FIG. 6 and FIG. 7, DCT coefficients in a block are indicated by reference symbols to which an identification character of the block is attached. For example, a DCT coefficient of the block A is referred to as "DCT_A (1, 4)".

FIG. 6 illustrates an example in which the DCT coefficient linear estimation module 12 performs linear estimation by using only processed DCT coefficients in the processed blocks and the block which is being processed. In the example of FIG. 6, only the left block and the upper block of the center block are used as the processed blocks, to simplify the explanation.

An estimated value EDCT_C (1, 6) for a DCT_C(1,6) which is a DCT coefficient to be processed is represented by the following expression (1).

$$EDCT\_C(1,6)=a(1,6; A,1,4)*DCT\_A(1,4)+a(1,6; A,1,5)*DCT\_A(1,5)+a(1,6; A,1,6)*DCT\_A(1,6)+a(1,6; A,1,7)*DCT\_A(1,7)+a(1,6; B,1,6)*DCT\_B(1,6)+a(1,6; B,4,6)*DCT\_B(4,6)+a(1,6; B,5,6)*DCT\_B(5,6)+a(1,6; B,6,6)*DCT\_B(6,6)+a(1,6; B,7,6)*DCT\_B(7,6)+a(1,6; C,1,2)*DCT\_C(1,2)+a(1,6; C,1,4)*DCT\_C(1,4)+a(1,6; C,1,6)*DCT\_C(1,6) \quad \text{Expression (1)}$$

The above expression is formed of the product of a set of DCT coefficients used for linear estimation and estimation coefficients a (1,6; . . . ), . . . corresponding to the coefficients. In the present embodiment, correlation between the order (the order (1, 6) in this example) for estimation and the DCT coefficient is determined in advance from a number of learning images, and the estimation coefficient is determined in advance such that optimum estimation can be performed. When the DCT coefficient to be estimated is changed, the set of DCT coefficients used for estimation and estimation coefficients corresponding to the coefficients also change.

The above estimated coefficient value limiting module 13 limits the DCT coefficient estimated as described above, in accordance with the quantization step. Thereby, correction of the DCT coefficient is finished.

In the example illustrated in FIG. 6, the DCT_C (1, 6) which is a DCT coefficient to be processed is replaced by a corrected value. After the replacement, the apparatus goes to estimation processing of DCT_C (2, 5) which is a DCT coefficient which is to be processed next in accordance with the zigzag scanning order. When correction for all the DCT coefficients in the block C is finished, the block C which has the corrected DCT coefficients is transmitted to the two-dimensional inverse DCT module 3.

In the example illustrated in FIG. 7, the DCT coefficients of unprocessed blocks are used for estimation of to-be-processed DCT coefficients. For this reason, the inverse quantization module 2 has to delay the processing starting with the DCT coefficient estimation, until the necessary data is obtained. In the example illustrated in FIG. 7, the block E which is the right adjacent block of the center block C being an unprocessed block and the block D which is an adjacent block located the bottom of the block C are used for estimation of a to-be-processed DCT coefficient of the block C, and thus it is necessary to perform delay for one horizontal block line. DCT coefficients before estimation which are obtained by the inverse quantization module 2 in advance are accumulated in the DCT coefficient buffer 11. An estimated value EDCT_C (1, 6) of DCT_C (1, 6) which is the to-be-processed DCT coefficient is indicated by the following expression (2) by using an estimation coefficient C (1, 6; . . . ) which is determined in advance.

$$EDCT\_C(1,6)=c(1,6; A,1,4)*DCT\_A(1,4)+c(1,6; A,1,5)*DCT\_A(1,5)+c(1,6; A,1,6)*DCT\_A(1,6)+c(1,6; A,1,7)*DCT\_A(1,7)+c(1,6; B,1,6)*DCT\_B(1,6)+c(1,6; B,4,6)*DCT\_B(4,6)+c(1,6; B,5,6)*DCT\_B(5,6)+c(1,6; B,6,6)*DCT\_B(6,6)+c(1,6; B,7,6)*DCT\_B(7,6)+c(1,6; C,1,2)*DCT\_C(1,2)+c(1,6; C,1,4)*DCT\_C(1,4)+c(1,6; C,1,6)*DCT\_C(1,6)+c(1,6; D,1,6)*DCT\_D(1,6)+c(1,6; D,4,6)*DCT\_D(4,6)+c(1,6; D,5,6)*DCT\_D(5,6)+c(1,6; E,1,5)*DCT\_E(1,5)+c(1,6; E,1,6)*DCD\_E(1,6)+c(1,6; E,1,7)*DCT\_E(1,7) \quad \text{Expression (2)}$$

As described above, the image decoding apparatus according to the first embodiment can perform effective estimation for all the DCT coefficients from low-order coefficients to high-order coefficients, when an encoded image is decoded. Therefore, the image decoding apparatus can restore deteriorated images more positively and with high accuracy, not only encoding distortion removal like symptomatic treatment such as removal of block distortion and mosquito distortion, but also restoration of high-frequency components which are lost by quantization.

FIG. 8 is a block diagram illustrating a modification of the structure of the image decoding apparatus according to the first embodiment.

When the image encoding apparatus performs the above estimated residual encoding, the image decoding apparatus has the structure as illustrated in FIG. 8. The structure further includes a second two-dimensional inverse DCT module 3b, a buffer 14, and an estimation module 15, in comparison with the structure illustrated in FIG. 3. A DCT coefficient correction module 10 illustrated in FIG. 8 indicates the DCT coefficient buffer 11, the DCT coefficient linear estimation module 12, and the estimated coefficient value limiting module 13 illustrated in FIG. 3, which are united as one unit.

In the modification, to generate an estimated image, the two-dimensional inverse DCT module 3b performs two-dimensional inverse DCT by using a non-corrected DCT coefficient supplied from the inverse quantization module 2, not to cause mismatch between the image decoding apparatus and the image encoding apparatus. Then, decoded image blocks which are results of the above processing are accumulated in the buffer 14.

The estimation module 15 generates an estimated image from the decoded image accumulated in the buffer 14. The generation result is added by a first adder to decoded image block output from the two-dimensional inverse DCT module 3 and the estimated residual decoded image block output from the two-dimensional inverse DCT module 3b. An addition result of the estimated image from the estimation module 15 and the estimated residual decoded image block output from the two-dimensional inverse DCT module 3b is output to the buffer 14.

On the other hand, the image decoding apparatus performs two-dimensional inverse DCT by the two-dimensional inverse DCT module 3 for a DCT coefficient which is obtained by correcting the DCT coefficient from the inverse quantization module 2 by the DCT coefficient correction module 10. The image decoding apparatus adds this processing result to the estimated image by a second adder, and thereby obtains a final output image. As described above, the processing performed by the image decoding apparatus which has the structure illustrated in FIG. 1 is the same as the processing performed by the image decoding apparatus which has the structure illustrated in FIG. 8, except for processing relating to generation of the estimated image.

(Second Embodiment)

Next, a second embodiment will be explained hereinafter. In structures of image decoding apparatuses of the following embodiments, explanation Of constituent elements which are the same as those illustrated in FIG. 3 is omitted.

Figure 9:
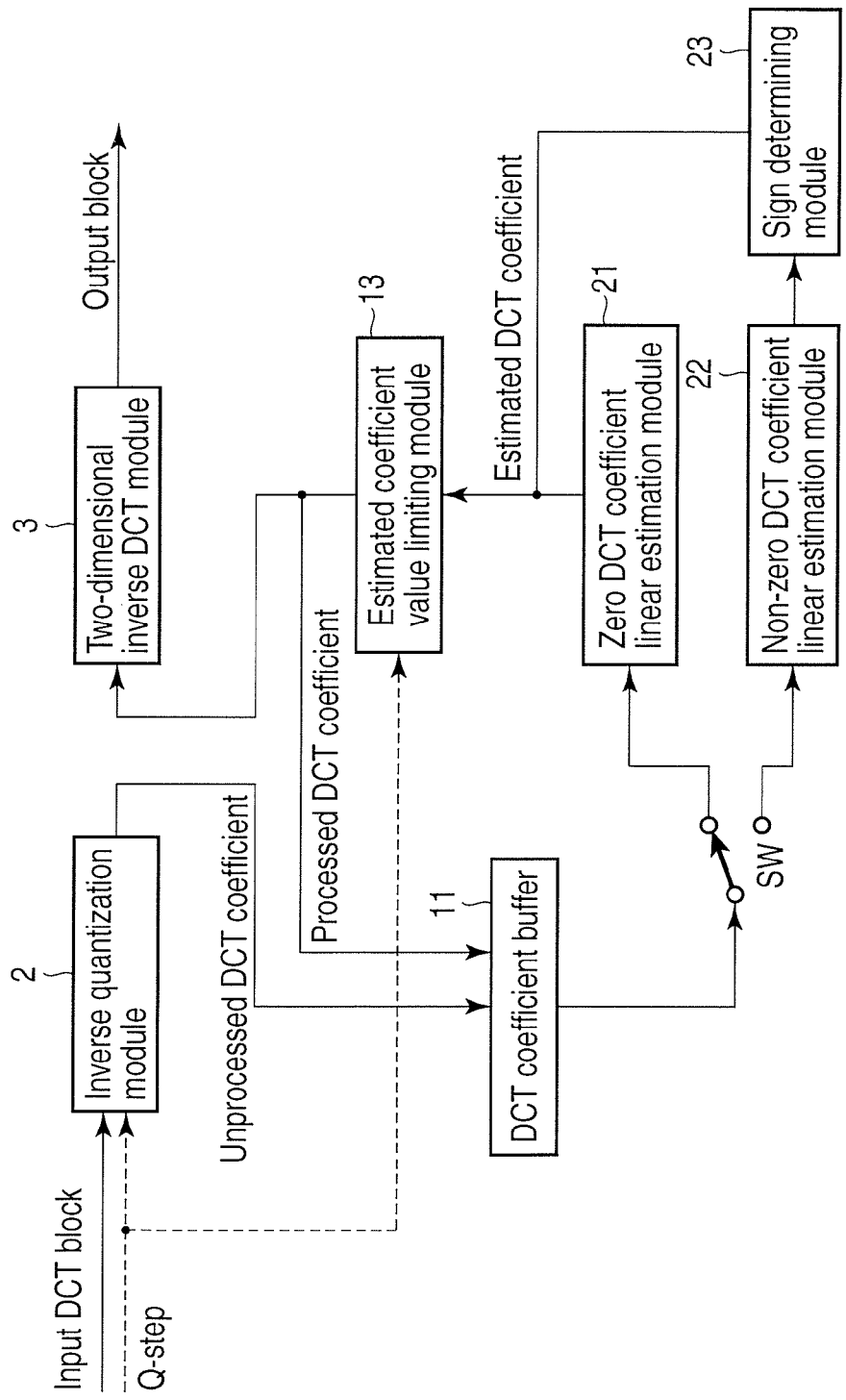
FIG. 9 is a block diagram illustrating a structure example of an image decoding apparatus according to a second embodiment.

FIG. 9 is a block diagram illustrating a structure example of an image decoding apparatus according to a second embodiment.

The image decoding apparatus according to the present embodiment performs processing steps which are different between the case where a DCT coefficient to be corrected has a value of 0 in the process of quantization and the other cases.

As illustrated in FIG. 9, the image decoding apparatus according to the second embodiment comprises a zero DCT coefficient linear estimation module 21, a non-zero DCT coefficient linear estimation module 22, and a sign determining module 23, instead of the DCT coefficient linear estimation module 12, in comparison with the structure illustrated in FIG. 3.

In addition, a switch is connected to the DCT coefficient buffer 11. The switch is, for example, a switching element, which is changed to either of the zero DCT coefficient linear estimation module 21 and the non-zero DCT coefficient linear estimation module 22.

Figure 10:
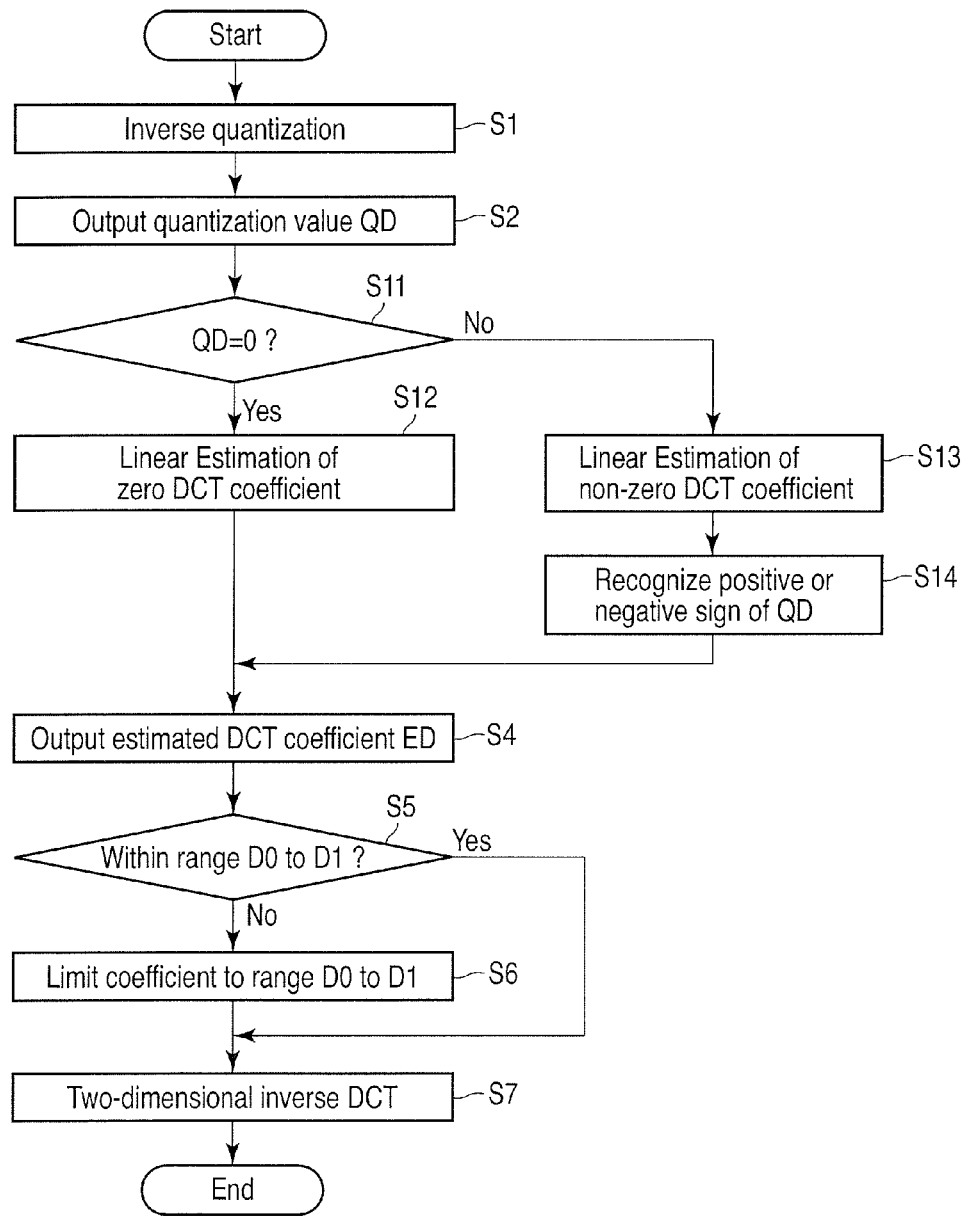
FIG. 10 is a flowchart illustrating an example of processing operation of the image decoding apparatus according to the second embodiment.

FIG. 10 is a flowchart illustrating an example of processing operation of the image decoding apparatus according to the second embodiment.

First, as explained in the first embodiment, the inverse quantization module 2 performs inverse quantization for data in a block which is a decoding result obtained by the entropy decoder 1 illustrated in FIG. 1 (Step S1). The inverse quantization module 2 obtains a quantization typical value QD by the processing, and outputs the quantization typical value QD to the DCT coefficient buffer 11 (Step S2).

Then, when the value of the DCT coefficient which is the quantization typical value QD from the inverse quantization module 2 is completely zero (YES in Step S11), the switch is changed to the zero DCT coefficient linear estimation module 21. The zero DCT coefficient linear estimation module 21 performs linear estimation of the DCT coefficient, based on the quantization typical value QD of the DCT coefficient, in the same manner as the DCT coefficient linear estimation module 12 explained in the first embodiment (Step S12). The zero DCT coefficient linear estimation module 21 obtains an estimated DCT coefficient ED by the processing, and outputs the estimated DCT coefficient ED to the estimated coefficient value limiting module 13 (Step S4).

On the other hand, when the quantization typical value has a value other than 0 (NO in Step S11), the switch is changed to the non-zero DCT coefficient linear estimation module 22. The non-zero DCT coefficient linear estimation module 22 performs linear estimation of the absolute value of the DCT coefficient, based on the quantization typical value QD of the DCT coefficient (Step S13). Then, the sign determining module 23 determines a positive or negative sign of the quantization typical value output from the inverse quantization module 2 as the sign of the absolute value of the value which is estimated by the non-zero DCT coefficient linear estimation module 22 (Step S14). The sign determining module 23 obtains an estimated DCT coefficient ED on which the sign is reflected, and outputs the estimated DCT coefficient ED to the estimated coefficient value limiting module 13 (Step S4). After the processing of Step S4, the processing from Step S5 to Step S7 explained in the first embodiment is performed.

As described above, when the quantization typical value has a value other than 0, the image decoding apparatus in the second embodiment performs linear estimation of the absolute value of the DCT coefficient, and determines a positive or negative sign of the quantization typical value as a sign of the value estimated by the non-zero DCT coefficient linear estimation module 22. The image decoding apparatus explained in the first embodiment may erroneously estimate the positive or negative sign of the DCT coefficient. However, the image decoding apparatus according to the second embodiment can prevent output of a DCT coefficient estimated value to which an erroneous sign is attached.

Next, a modification of the second embodiment will be explained hereinafter. FIG. 11 is a block diagram illustrating a modification of the structure of the image decoding apparatus according to the second embodiment.

As illustrated in FIG. 11, in the modification, the image decoding apparatus further comprises a DCT coefficient absolute value linear estimation module 31, and a sign determining module 32, in comparison with the structure illustrated in FIG. 3.

Figure 12:
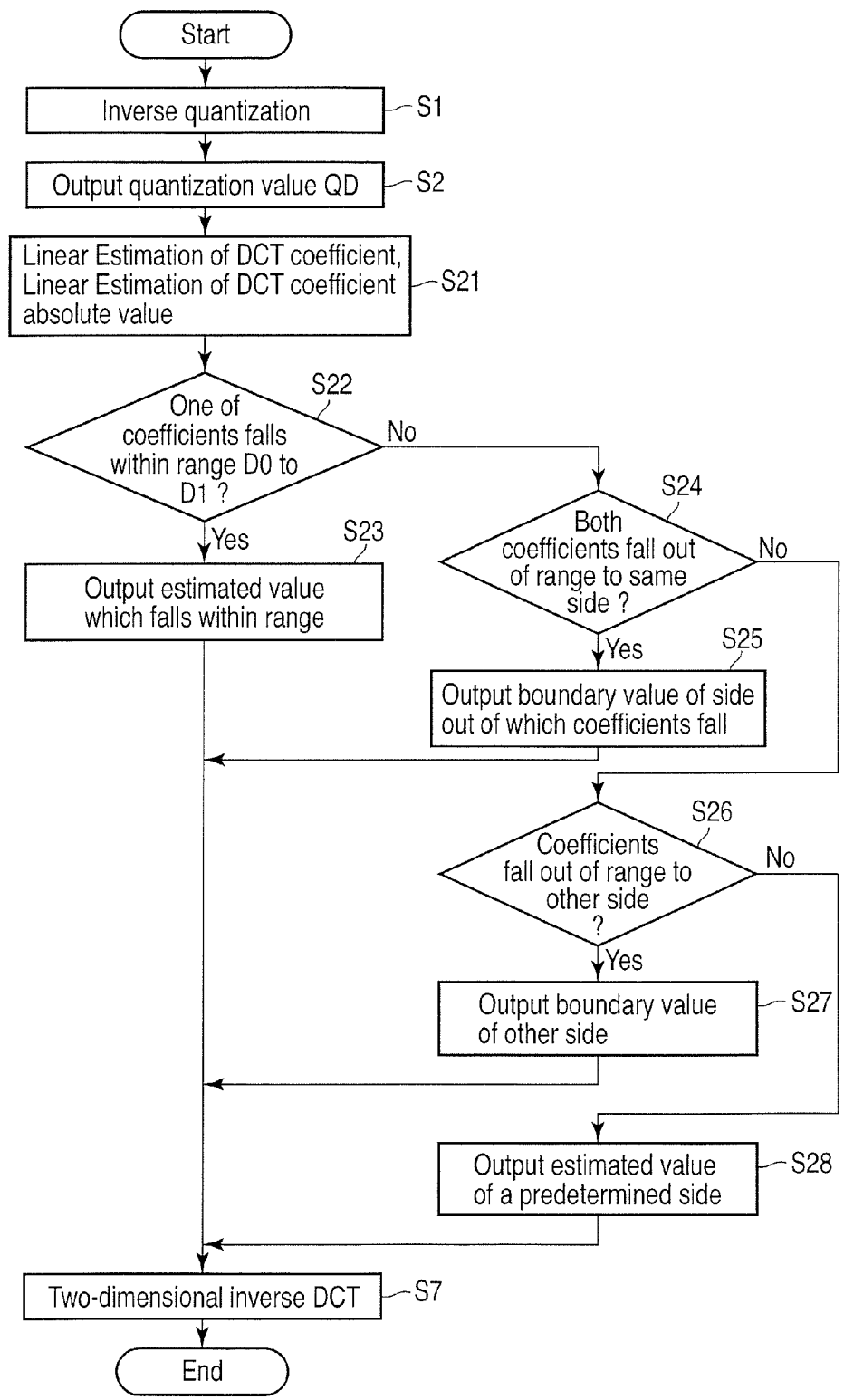
FIG. 12 is a flowchart illustrating a modification of processing operation of the image decoding apparatus according to the second embodiment.

FIG. 12 is a flowchart illustrating a modification of the processing operation of the image decoding apparatus according to the second embodiment.

First, as explained in the first embodiment, the inverse quantization module 2 performs inverse quantization for data in a block which is a decoding result obtained by the entropy decoder 1 illustrated in FIG. 1 (Step S1). The inverse quantization module 2 obtains a quantization typical value QD by the processing, and outputs the quantization typical value QD to the DCT coefficient buffer 11 (Step S2).

Then, the DCT coefficient linear estimation module 12 performs linear estimation of the DCT coefficient, based on the quantization typical value QD of the DCT coefficient. By the processing, the DCT coefficient linear estimation module 12 obtains an estimated DCT coefficient ED as illustrated in FIG. 2, and outputs the estimated DCT coefficient ED to the estimated coefficient value limiting module 13. In addition, the DCT coefficient absolute value linear estimation module 31 performs linear estimation of the absolute value of the DCT coefficient, based on the quantization typical value QD of the DCT coefficient. Then, the sign determining module 32 determines a positive or negative sign of the quantization typical value output from the inverse quantization module 2 as a sign of the absolute value estimated by the DCT coefficient absolute value linear estimation module 31. The sign determining module 32 obtains an estimated DCT coefficient ED on which the sign is reflected, and outputs the estimated DCT coefficient ED to the estimated coefficient value limiting module 13 (Step S21).

When only one of the estimated DCT coefficient from the DCT coefficient linear estimation module 12 and the estimated DCT coefficient from the DCT coefficient absolute value linear estimation module 31 falls within a predetermined range D0 to D1 illustrated in FIG. 2 (YES in Step S22), the estimated coefficient value limiting module 13 outputs the estimated DCT coefficient which falls within the range to the two-dimensional inverse DCT module 3 (Step S23).

When both the estimated DCT coefficient from the DCT coefficient linear estimation module 12 and the estimated DCT coefficient from the DCT coefficient absolute value linear estimation module 31 fall out of the predetermined range of D0 to D1 illustrated in FIG. 2 and both the coefficients are less than D0, the estimated coefficient value limiting module 13 outputs the boundary value D0, out of which the coefficients fall, to the two-dimensional inverse DCT module 3.

When both the estimated DCT coefficient from the DCT coefficient linear estimation module 12 and the estimated DCT coefficient from the DCT coefficient absolute value linear estimation module 31 fall out of the predetermined range of D0 to D1 illustrated in FIG. 2 and both the coefficients exceed D1, the estimated coefficient value limiting module 13 outputs the boundary value D1, out of which the coefficients fall, to the two-dimensional inverse DCT module 3 (Step S24 to Step S25).

When both the estimated DCT coefficient from the DCT coefficient linear estimation module 12 and the estimated DCT coefficient from the DCT coefficient absolute value linear estimation module 31 fall out of the predetermined range of D0 to D1 illustrated in FIG. 2, one of the coefficients is less than D0, the other exceeds D1, and a difference between the one coefficient and D0 is smaller than a difference between the other coefficient and D1, the estimated coefficient value limiting module 13 outputs the boundary value D0, which is a boundary value closer to the estimated value, to the two-dimensional inverse DCT module 3.

When both the estimated DCT coefficient from the DCT coefficient linear estimation module 12 and the estimated DCT coefficient from the DCT coefficient absolute value linear estimation module 31 fall out of the predetermined range of D0 to D1 illustrated in FIG. 2, one of the coefficients is less than D0, the other exceeds D1, and a difference between the other coefficient and D1 is smaller than a difference between the one coefficient and D0, the estimated coefficient value limiting module 13 outputs the boundary value D1, which is a boundary value closer to the estimated value, to the two-dimensional inverse DCT module 3 (Step S26 to Step S27).

When both the estimated DCT coefficient from the DCT coefficient linear estimation module 12 and the estimated DCT coefficient from the DCT coefficient absolute value linear estimation module 31 fall within the predetermined range of D0 to D1 illustrated in FIG. 2 (NO in Step S26), the estimated coefficient value limiting module 13 outputs predetermined one of the estimated DCT coefficient from the DCT coefficient linear estimation module 12 and the estimated DCT coefficient from the DCT coefficient absolute value linear estimation module 31, to the two-dimensional inverse DCT module 3 (Step S28).

As explained above, in the present modification, the image decoding apparatus does not perform different processes between the case where the quantization typical value is 0 and the case where the quantization typical value is not 0. The image decoding apparatus performs ordinary linear estimation of the DCT coefficient and absolute value linear estimation of the DCT coefficient, regardless of the value of the quantization typical value, and outputs a value which is determined by comparing the obtained estimated values with the boundary values. Therefore, it is possible to obtain the same effect as that of the above second embodiment.

(Third Embodiment)

Next, a third embodiment will be explained. The present embodiment is effective when DCT coefficients of an unprocessed block are used for estimation as illustrated in FIG. 7.

FIG. 13 is a block diagram illustrating a structure example of an image decoding apparatus according to the third embodiment.

As illustrated in FIG. 13, the image decoding apparatus in the present embodiment further comprises a estimated coefficient set bank 41, and an estimated coefficient set selector 42, in comparison with the structure illustrated in FIG. 9. The estimated coefficient set bank 41 is a storage medium such as a nonvolatile memory. The estimated coefficient set bank 41 stores a plurality of estimated coefficient sets to be multiplied by a to-be-processed DCT coefficient.

Figure 14:
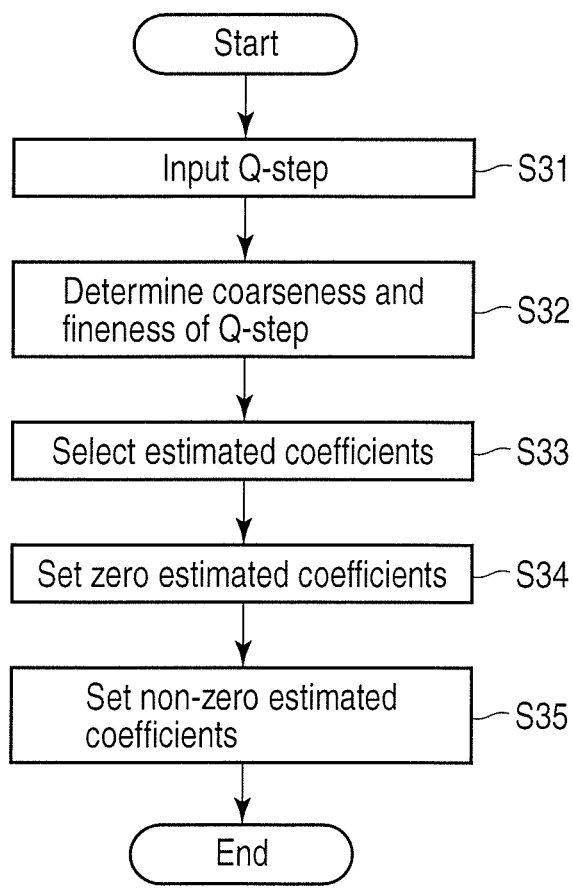
FIG. 14 is a flowchart illustrating an example of processing operation of the image decoding apparatus according to the third embodiment.

FIG. 14 is a flowchart illustrating an example of processing operation of the image decoding apparatus according to the third embodiment.

Q-step data from the entropy decoder 1 illustrated in FIG. 1 is input to the estimated coefficient set selector 42 (Step S31). The estimated coefficient set selector 42 determines coarseness and fineness of the input Q-step (Step S32).

When the Q-step input in the processing of Step S32 is coarse, the estimated coefficient set selector 42 reads an estimated coefficient set, by which the weight of the estimated coefficients for DCT coefficients of unprocessed blocks is smaller than the weight of the estimated coefficients for DCT coefficients for processed blocks, from the estimated coefficient set bank 41.

Conversely, when the Q-step input in the processing of Step S32 is fine, the estimated coefficient set selector 42 reads an estimated coefficient set, by which the weight of estimated coefficients for DCT coefficients of unprocessed blocks is smaller than the weight of estimated coefficients for DCT coefficients of processed blocks and is not much smaller than that of the case where the Q-step is coarse, from the estimated coefficient set bank 41 (Step S33).

Then, the estimated coefficient set selector 42 outputs the read estimated coefficient set to the zero DCT coefficient linear estimation module 21, and thereby sets zero estimated coefficients for processing to be performed by the zero DCT coefficient linear estimation module 21 (Step S34). The zero DCT coefficient linear estimation module 21 performs processing when setting of zero estimated coefficients from the estimated coefficient set selector 42 has been finished.

In addition, the estimated coefficient set selector 42 outputs the read estimated coefficient set to the non-zero DCT coefficient linear estimation module 22, and thereby sets non-zero estimated coefficients for processing to be performed by the non-zero DCT coefficient linear estimation module 22 (Step S35). The non-zero DCT coefficient linear estimation module 22 performs processing when setting of non-zero estimated coefficients from the estimated coefficient set selector 42 has been finished.

As explained above, the image decoding apparatus according to the third embodiment stores a plurality of types of estimated coefficient sets, and switches the zero DCT coefficients and non-zero DCT coefficients among them according to the value of the Q-step. Thereby, the image decoding apparatus can perform more proper estimation in the case of using DCT coefficients of unprocessed blocks for estimation.

The present embodiment shows the structure in which a plurality of types of estimated coefficient sets are stored, and the zero DCT coefficients and non-zero DCT coefficients among them are switched according to the value of the Q-step. However, the present embodiment is not limited to the structure, but may have a structure in which DCT coefficients for processing to be performed by the DCT coefficient linear estimation module 12 and DCT coefficients for processing to be performed by the DCT coefficient absolute value linear estimation module 31 are switched according to the value of the Q-step, in the structure illustrated in FIG. 11 which is a modification of the second embodiment.

In addition, for DCT_C (1, 6) which is a DCT coefficient to be processed, the estimated value EDCT_C (1, 6) obtained by the non-zero DCT coefficient linear estimation module 22 in the second and third embodiments and the estimated value EDCT_C (1, 6) obtained by the DCT coefficient absolute value linear estimation module 31 explained in the modification of the second embodiment are indicated by the following expression (3), expression (4), and expression (5). The reference symbol "b ( . . . )" in the expression (3) is an estimated coefficient which is determined in advance.

$$t=b(1,6;A,1,4)*|DCT\_A(1,4)|+b(1,6;A,1,5)*|DCT\_A(1,5)|+b(1,6;A,1,6)*|DCT\_A(1,6)|+b(1,6;A,1,7)*|DCT\_A(1,7)|+b(1,6;B,1,6)*|DCT\_B(1,6)|+b(1,6;B,4,6)*|DCT\_B(4,6)|+b(1,6;B,5,6)*|DCT\_B(5,6)|+b(1,6;B,6,6)*|DCT\_B(6,6)|+b(1,6;B,7,6)*|DCT\_B(7,6)|+b(1,6;C,1,2)*|DCT\_C(1,2)|+b(1,6;C,1,4)*|DCT\_C(1,4)|+b(1,6;C,1,6)*|DCT\_C(1,6)|$$ Expression (3)

$$EDCT\_C(1,6)=t \text{ (in the case of } DCT\_C(1,6)>0)$$ Expression (4)

$$EDCT\_C(1,6)=-t \text{ (in the case of } DCT\_C(1,6)<0)$$ Expression (5)

In addition, in the case where DCT coefficients of unprocessed blocks are also used for estimation as described above, for DCT_C (1, 6) which is a DCT coefficient to be processed, the estimated value EDCT_C (1, 6) obtained by the non-zero DCT coefficient linear estimation module 22 and the estimated value EDCT_C (1, 6) obtained by the DCT coefficient absolute value linear estimation module 31 are indicated by the following expression (6), expression (7), and expression (8). The reference symbol "d ( . . . )" in the expression (6) is an estimated coefficient which is determined in advance.

$$t=d(1,6;A,1,4)*|DCT\_A(1,4)|+d(1,6;A,1,5)*|DCT\_A(1,5)|+d(1,6;A,1,6)*|DCT\_A(1,6)|+d(1,6;A,1,7)*|DCT\_A(1,7)|+d(1,6;B,1,6)*|DCT\_B(1,6)|+d(1,6;B,4,6)*|DCT\_B(4,6)|+d(1,6;B,5,6)*|DCT\_B(5,6)|+d(1,6;B,6,6)*|DCT\_B(6,6)|+d(1,6;B,7,6)*|DCT\_B(7,6)|+d(1,6;C,1,2)*|DCT\_C(1,2)|+d(1,6;C,1,4)*|DCT\_C(1,4)|+d(1,6;C,1,6)*|DCT\_C(1,6)|+d(1,6;D,1,6)*|DCT\_D(1,6)|+d(1,6;D,4,6)*|DCT\_D(4,6)|+d(1,6;D,5,6)*|DCT\_D(5,6)|+d(1,6;E,1,5)*|DCT\_E(1,5)|+d(1,6;E,1,6)*|DCD\_E(1,6)|+d(1,6;E,1,7)*|DCT\_E(1,7)|$$ Expression (6)

$$EDCT\_C(1,6)=t \text{ (in the case of } DCT\_C(1,6)>0)$$ Expression (7)

$$EDCT\_C(1,6)=-t \text{ (in the case of } DCT\_C(1,6)<0)$$ Expression (8)

According to the above embodiments, it is possible to provide an image decoding apparatus, an image decoding method, and a computer readable, non-transitory storage medium, which can restore data that is lost by image quantization with high accuracy.

The methods described in the embodiments can be stored in a storage medium such as magnetic disks (such as flexible disks and hard disks), optical disks (CD-ROMs, DVDs, MOs), and semiconductor memories (ROMs, RAMs, and flash memories) as programs (software means) which can be executed by a computer, and can be transmitted and distributed by a communication medium. The programs stored in a medium include a setting program which forms software means (including not only an executed program but also a table and a data structure) to be executed by a computer in the computer. A computer which realizes the present apparatus reads the programs recorded on a recording medium, or constructs software means by the setting program if necessary, and executes the above processing by controlling operation thereof by the software means. The recording medium referred to in the specification is not limited to those for distribution, but also includes a storage medium such as a magnetic disk and a semiconductor memory, which is provided in the computer or an apparatus which is connected to the computer through a network.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image decoding apparatus comprising:
    an entropy decoder configured to restore a quantization discrete cosine transformation coefficient by performing entropy decoding of an image, which is encoded by dividing the image into rectangular areas, each comprising a predetermined number of pixels, and successively subjecting each of the rectangular areas of the image to two-dimensional discrete cosine transformation and quantization;
    an inverse quantization module configured to perform inverse quantization for a result of the decoding;
    an estimation module configured to perform linear estimation of a correction value of a discrete cosine transformation coefficient to be processed, for an inverse quantization result, based on discrete cosine transformation coefficient of a rectangular area including pixels to be processed and discrete cosine transformation coefficient of an area adjacent to the rectangular area including the pixels to be processed, when the discrete cosine transformation coefficient of the rectangular area including the pixels to be processed is zero, and to perform linear estimation of the correction value of the coefficient for the inverse quantization result, by adding a positive or negative sign of the coefficient before being corrected to a linear estimation result of an absolute value of the correction value of the coefficient, based on the discrete cosine transformation coefficient of the rectangular area including the pixels to be processed and discrete cosine transformation coefficient of the area adjacent to the rectangular area including the pixels to be processed, when the discrete cosine transformation coefficient of a rectangular area including the pixels to be processed is not zero;
    an estimation coefficient value limiting module configured to limit the correction value such that the correction value estimated by the estimation module falls within a predetermined range based on a quantization step; and
    an inverse discrete cosine transformation module configured to perform two-dimensional inverse discrete cosine transformation for a processing result obtained by the estimation coefficient value limiting module.

2. The image decoding apparatus of claim 1,
    wherein the estimation module is configured to performs linear estimation of the correction value of the discrete cosine transformation coefficient to be processed, by multiplying a predetermined estimation coefficient by discrete cosine transformation coefficient of the rectangular area including the pixels to be processed, discrete cosine transformation coefficient of a rectangular area which is adjacent to the rectangular area to be processed and in which linear estimation of the correction value has been performed for each of the discrete cosine transformation coefficient, and discrete cosine transformation coefficient of a rectangular area which is adjacent to the rectangular area to be processed and in which no discrete cosine transformation coefficient has been subjected to linear estimation of the correction value, the apparatus further comprising:

an estimation coefficient storing module configured to store a plurality of estimation coefficients, and wherein the estimation module is configured to perform linear estimation of the correction value of the discrete cosine transformation coefficient to be processed, based on an estimation coefficient which is selected according to a value of the quantization step from among the estimation coefficients stored in the estimation coefficient storing module.

3. An image decoding method comprising:

restoring a quantization discrete cosine transformation coefficient by performing entropy decoding of an image, which is encoded by dividing the image into rectangular areas, each comprising of a predetermined number of pixels, and successively subjecting each of the rectangular areas of the image to two-dimensional discrete cosine transformation and quantization;

performing inverse quantization for a result of the decoding;

performing linear estimation of a correction value of a discrete cosine transformation coefficient to be processed, for an inverse quantization result, based on discrete cosine transformation coefficient of a rectangular area including pixels to be processed and discrete cosine transformation coefficient of an area adjacent to the rectangular area including the pixels to be processed, when the discrete cosine transformation coefficient of the rectangular area including the pixels to be processed is zero, and performing linear estimation of the correction value of the coefficient for the inverse quantization result by adding a positive or negative sign of the coefficient before being corrected to a linear estimation result of an absolute value of the correction value of the coefficient, based on the discrete cosine transformation coefficient of the rectangular area including the pixels to be processed and discrete cosine transformation coefficient of the area adjacent to the rectangular area including the pixels to be processed, when the discrete cosine transformation coefficient of the rectangular area including the pixels to be processed is not zero;

limiting the correction value such that the estimated correction value falls within a predetermined range based on a quantization step; and performing two-dimensional inverse discrete cosine transformation for a value obtained by limiting the correction value.

4. The image decoding method of claim 3, wherein performing linear estimation of the correction value comprises performing linear estimation of the correction value of the discrete cosine transformation coefficient to be processed, by multiplying a predetermined estimation coefficient by other discrete cosine transformation coefficient of the rectangular area including the pixels to be processed, discrete cosine transformation coefficient of a rectangular area which is adjacent to the rectangular area to be processed and in which linear estimation of the correction value has been performed for each of the discrete cosine transformation coefficient, and discrete cosine transformation coefficient of a rectangular area which is adjacent to the rectangular area to be processed and in which no discrete cosine transformation coefficient has been subjected to linear estimation of the correction value, storing a plurality of estimation coefficients and performing linear estimation of the correction value comprise performing linear estimation of the correction value of the discrete cosine transformation coefficient to be processed, based on an estimation coefficient which is selected according to a value of the quantization step from among the stored estimation coefficients.

5. A computer readable, non-transitory storage medium having stored thereon a computer program which is executable by a computer, the computer program controlling the computer to execute functions of:

restoring a quantization discrete cosine transformation coefficient by performing entropy decoding of an image, which is encoded by dividing the image into rectangular areas, each comprising of a predetermined number of pixels, and successively subjecting each of the rectangular areas of the image to two-dimensional discrete cosine transformation and quantization;

performing inverse quantization for a result of the decoding;

performing linear estimation of a correction value of a discrete cosine transformation coefficient to be processed, for an inverse quantization result, based on discrete cosine transformation coefficient of a rectangular area including pixels to be processed and discrete cosine transformation coefficient of an area adjacent to the rectangular area including the pixels to be processed, when the discrete cosine transformation coefficient of the rectangular area including the pixels to be processed is zero, and performing linear estimation of the correction value of the coefficient for the inverse quantization result by adding a positive or negative sign of the coefficient before being corrected to a linear estimation result of an absolute value of the correction value of the coefficient, based on the discrete cosine transformation coefficient of the rectangular area including the pixels to be processed and discrete cosine transformation coefficient of the area adjacent to the rectangular area including the pixels to be processed, when the discrete cosine transformation coefficient of the rectangular area including the pixels to be processed is not zero;

limiting the correction value such that the estimated correction value falls within a predetermined range based on a quantization step; and performing two-dimensional inverse discrete cosine transformation for a value obtained by limiting the correction value.

* * * * *